(12) United States Patent
Sato

(10) Patent No.: US 7,256,827 B1
(45) Date of Patent: Aug. 14, 2007

(54) IMAGE READING DEVICE WITH THINNED PIXEL DATA

(75) Inventor: Koichi Sato, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/450,514

(22) Filed: Nov. 30, 1999

(30) Foreign Application Priority Data

Dec. 1, 1998 (JP) ............................... P10-341680

(51) Int. Cl.
*H04N 3/14* (2006.01)
*H04N 5/222* (2006.01)

(52) U.S. Cl. ............. 348/272; 348/333.11; 348/333.05
(58) Field of Classification Search ................ 348/272, 348/333.11, 333.05
See application file for complete search history.

(56) References Cited

U.S. PATENT DOCUMENTS

| | | | | |
|---|---|---|---|---|
| 4,779,135 A | * | 10/1988 | Judd | 348/565 |
| 5,038,202 A | * | 8/1991 | Ooishi et al. | 348/396.1 |
| 5,418,565 A | * | 5/1995 | Smith | 348/273 |
| 5,734,427 A | * | 3/1998 | Hayashi | 348/333.11 |
| 5,900,623 A | * | 5/1999 | Tsang et al. | 250/208.1 |
| 5,912,708 A | * | 6/1999 | Kondo et al. | 348/415.1 |
| 5,959,016 A | * | 9/1999 | Schmidt et al. | 524/399 |
| 6,002,429 A | * | 12/1999 | Ochi et al. | 348/220.1 |
| 6,091,513 A | * | 7/2000 | Ishihara et al. | 358/1.9 |
| 6,201,571 B1 | * | 3/2001 | Ota | 348/239 |
| 6,546,130 B1 | * | 4/2003 | Inoue et al. | 382/162 |
| 6,593,965 B1 | * | 7/2003 | Miyamoto | 348/280 |

* cited by examiner

*Primary Examiner*—Vivek Srivastava
*Assistant Examiner*—James M. Hannett
(74) *Attorney, Agent, or Firm*—Greenblum & Bernstein, P.L.C.

(57) ABSTRACT

The image reading device comprises an imaging device on which an on-chip color filter is provided. The on-chip color filter has color filter elements of the Bayer arrangement, for example. Pixel data, output from the imaging device, are stored in a memory. When the pixel data are read from the memory, some of the pixel data are thinned out, so that a thinned image data, colors of which are arranged in the same arrangement as the color filter elements of the imaging device, is obtained. The pixel data of the thinned image data are subjected to an interpolation process, so that one image's worth of pixel data are generated for each of the color components.

17 Claims, 6 Drawing Sheets

FIG. 6

| $R_{m,n}$ | $R_{m+3,n}$ | $R_{m+6,n}$ |
|---|---|---|
| $R_{m,n+3}$ | $R_{m+3,n+3}$ | $R_{m+6,n+3}$ |
| $R_{m,n+6}$ | $R_{m+3,n+6}$ | $R_{m+6,n+6}$ |

FIG. 7

| $R_{m,n}$ | $R_{m+5,n}$ | $R_{m+10,n}$ |
|---|---|---|
| $R_{m,n+5}$ | $R_{m+5,n+5}$ | $R_{m+10,n+5}$ |
| $R_{m,n+10}$ | $R_{m+5,n+10}$ | $R_{m+10,n+10}$ |

IMAGE READING DEVICE WITH THINNED PIXEL DATA

BACKGROUND OF THE INVENTION

1. Field of the Invention

The present invention relates to an image reading device in which image data, having a multitude of pixel data, is obtained by an imaging device, and after a reading operation of the pixel data from the imaging device, some of the pixel data are thinned out.

2. Description of the Related Art

Conventionally, there is known an image reading device, such as a digital camera, in which image data is obtained by an imaging device such as a CCD, and a color image, corresponding to the image data, can be recorded in a recording medium. The CCD is provided with an on-chip color filter, in which color filter elements of the three primary colors, for example, are provided on photo-diodes of the CCD. Namely, a pixel data generated by each of the photo-diodes corresponds to one of the primary colors, and thus, the pixel data does not indicate the other primary colors. Thus, an interpolation process is performed to obtain pixel data of the other primary colors.

A number of pixel data, recorded in the recording medium, is determined depending upon a recording mode, and is usually much less than that of the photo-diodes. Therefore, in a conventional device, after the interpolation process, some of pixel data are thinned out to reduce the number of pixel data in conformity with the number of pixel data to be recorded in the recording medium.

Thus, in the conventional device, three image frame's worth of color image data are generated because of the interpolation process, and the thinning process is then applied to the color image data. Namely, in the interpolation process and the thinning process, a large number of pixel data are processed, and therefore, it takes a long time to obtain the pixel data to be recorded.

SUMMARY OF THE INVENTION

Therefore, an object of the present invention is to provide an image reading device by which the interpolation process and the thinning process are carried out in a reduced time, in comparison with a conventional device.

According to the present invention, there is provided an image reading device comprising an imaging device, a reading processor, a thinning processor and an interpolation processor.

The imaging device has photo-diodes and color filters provided on the imaging device, the color filter having color filter elements of a plurality of colors. The photo-diodes generate an original image data containing pixel data, each of which corresponds to one of the colors which are arranged in a predetermined distribution. The reading processor reads the pixel data from the imaging device. The thinning processor thins out some of the pixel data to generate a thinned image data, colors of which are arranged in the predetermined distribution. The interpolation processor performs an interpolation process on the thinned image data to generate an interpolated image data for each of the colors.

Further, according to the present invention, there is provided an image reading device in which pixel data of a first image, formed on an imaging device having an on-chip color filter of a plurality of colors, are point-sequentially read from said imaging device and are subjected to an interpolation process to generate components of said plurality of colors for each of said pixel data to obtain a second image, the image reading device comprising a thinning processor that thins out some of the pixel data before the pixel data are subjected to the interpolation process, so that said second image is composed of a smaller number of pixels than the first image.

BRIEF DESCRIPTION OF THE DRAWINGS

The present invention will be better understood from the description of the preferred embodiments of the invention set forth below, together with the accompanying drawings, in which:

FIG. 6 is a view showing interpolated image data of the =R component, which have been subjected to an interpolation process after the thinning process using the reduction ratio of ($\frac{1}{3} \times \frac{1}{3}$) time;

FIG. 7 is a view showing interpolated image data of the R component, which have been subjected to an interpolation process after the thinning process using the reduction ratio of ($\frac{1}{5} \times \frac{1}{5}$) time.

DESCRIPTION OF THE PREFERRED EMBODIMENTS

Figure 1:
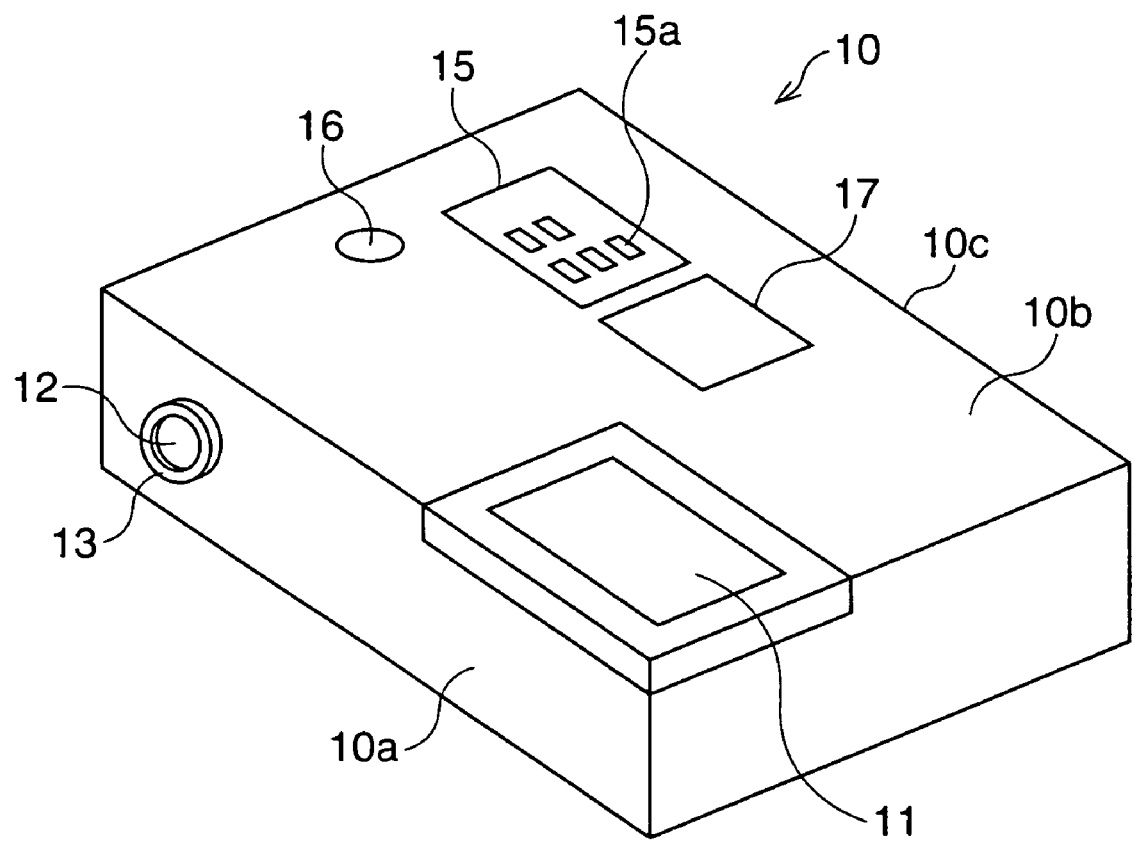
FIG. 1 is a perspective view showing a digital camera which is an image reading device to which an embodiment of the present invention is applied.

The present invention will be described below with reference to embodiments shown in the drawings.

FIG. 1 shows a digital camera (i.e., an image reading device) 10 to which an embodiment of the present invention is applied. By the digital camera 10, a photographed color image can be recorded in a memory card (not shown) mounted in the camera 10. The color image is reduced with a predetermined reduction ratio, so that the reduced color image can be indicated by a liquid crystal display (LCD) 11.

The digital camera 10 is provided with a lens barrel 13 on a front surface 10a of the camera 10, and a photographing optical system 12 is held in the lens barrel 13. On a rear surface 10c of the camera 10, a view-finder (not shown) is provided.

The LCD 11 is provided on an upper surface 10b of the camera 10. A release button 16 is provided on the upper surface 10b. An operation panel 15 and an indication panel 17 are also disposed on the upper surface 10b. The operation panel 15 is provided with various kinds of operation buttons including a reduction ratio setting button, by which the reduction ratio of the color image is set, and a cancel button, by which an operation of the digital camera 10 is canceled. The reduction ratio setting button is constructed in such a manner that the reduction ratio is changed to one time, (⅓×⅓) time and (⅕×⅕) time, in this order, with every depressing operation of the button (i.e., whenever the button is depressed). The indication panel 17 is a liquid crystal display, for example, in which numerals and a predetermined figure signifying the reduction ratio can be indicated.

Figure 2:
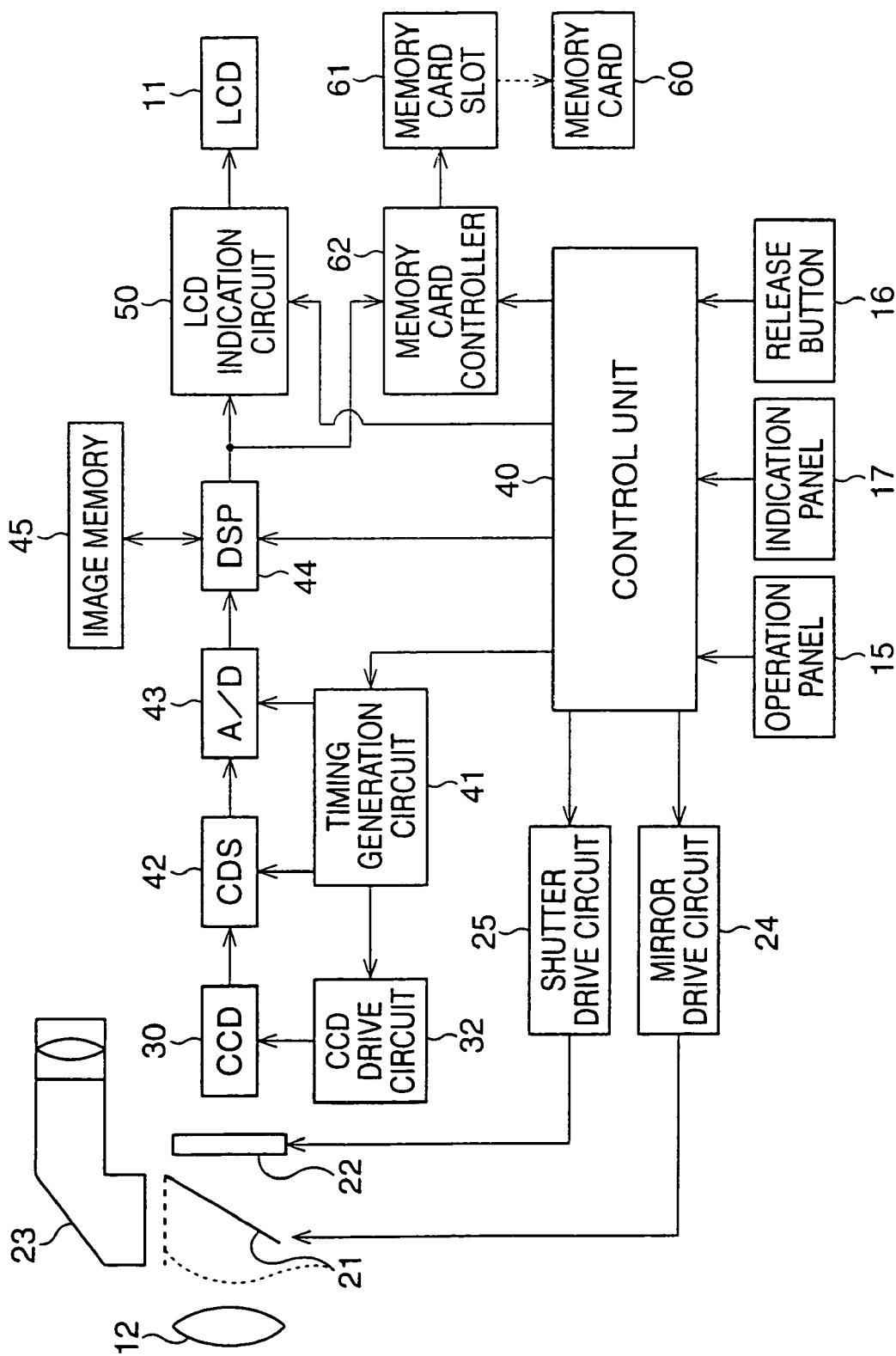
FIG. 2 is a block diagram showing electric circuits provided in the digital camera.

With reference to FIG. 2, an electric construction of the digital camera 10 will be described below.

The operation panel 15, the release button 16 and the indication panel 17 are connected to a control unit 40 having a micro-computer. Operations of the digital camera 10 are performed by depressing various kinds of operation buttons provided in the operation panel 15 or the release button 16, and are controlled by the control unit 40.

An imaging device (CCD) 30 is mounted in the digital camera 10. Between the photographing optical system 12 and the CCD 30, a quick return mirror 21 and a shutter 22 are provided, the shutter 22 being disposed behind the quick return mirror 21. A view-finder optical system 23 is positioned above the quick return mirror 21.

The CCD 30 is an area sensor having a light receiving surface on which a multitude of photo-diodes are arranged, on which an on-chip color filter of the Bayer arrangement is provided. Namely, the color filter has color filter elements of the three primary colors, i.e., red (R), green (G) and blue (B), and thus, the photo-diodes generate an original image data comprising analog pixel data, each of which corresponds to one of the three primary colors.

The quick return mirror 21 can be rotated between an inclined state shown in a solid line and a horizontal state shown in a broken line. The quick return mirror 21 is usually positioned in the inclined state, so that light, passing through the photographing optical system 12, is led to the view-finder optical system 23. In this state, the shutter 22 is closed to block an optical path to the CCD 30. Conversely, when the release button 16 is depressed to perform a photographing operation, the quick return mirror 21 is rotated upward under control of a mirror drive circuit 24, and is set to the horizontal state. While the mirror 21 is positioned at the horizontal state, the shutter 22 is opened under control of a shutter drive circuit 25, and thus, light passing through the photographing optical system 12 enters a light receiving surface of the CCD 30.

A timing generation circuit 41 is connected to the control unit 40, so that a timing signal is generated by the timing generation circuit 41 under control of the control unit 40. Based on the timing signal, a CCD drive circuit 32, a correlated double sampling circuit (CDS) 42 and an A/D converter 43 are driven.

When the release button 16 is depressed, a photographing operation is performed. Namely, the CCD 30 is controlled by the CCD drive circuit 32, so that one image's worth of analog pixel data of R, G and B components are point-sequentially read from the CCD 30, and reset noises are removed from the pixel data. Then, the analog pixel data are converted to digital pixel data by the A/D converter 43. The digital pixel data are stored in an image memory 45 through a digital signal processing circuit (DSP) 44.

The digital pixel data are read from the image memory 45, and are subjected to a thinning process, by which a color image is reduced, in the DSP 44 to obtain thinned image data. The thinning process is carried out in accordance with a reduction ratio which is set by the reduction ratio setting button provided in the operation panel 15. After the thinning process, the thinned image data are subjected to an interpolation process, so that interpolated image data of R, G and B components are generated in accordance with a color arrangement of the LCD 11. The digital pixel data, subjected to the interpolation process, are subjected to predetermined processes including a color correction and a gamma correction, and then stored in a memory (not shown) provided in an LCD indication circuit 50. The digital pixel data, stored in the memory, are read therefrom under control of the LCD indication circuit 50, so that a color image is indicated by the LCD 11 based on the digital pixel data, i.e., the interpolated image data.

When the image indicated by the LCD 11 is verified by the operator, and the release button 16 is again depressed, an image recording operation is performed, which is described below. The digital pixel data, which are stored in the image memory 45, have not been subjected to a thinning process and an interpolation process. When the digital pixel data are read from the image memory 45, the digital pixel data are subjected to the thinning process by the DSP 44, in accordance with a reduction ratio set by the operation panel 15 to obtain thinned image data. Then, the thinned image data are subjected to the interpolation process, so that interpolated image data of R, G and B components are generated for each of the pixels of the image. The interpolated image data are then converted to luminance data and color differential data by a memory card controller 62. The luminance data and the color differential data are then subjected to a predetermined process including a compression process, and are then stored in a memory card 60 through a memory card slot 61.

Note that the reduction ratio is usually set to 1, and when the image is not reduced, the digital pixel data, read from the image memory 45, are not subjected to the thinning process, but are subjected to the interpolation process.

Figure 3:
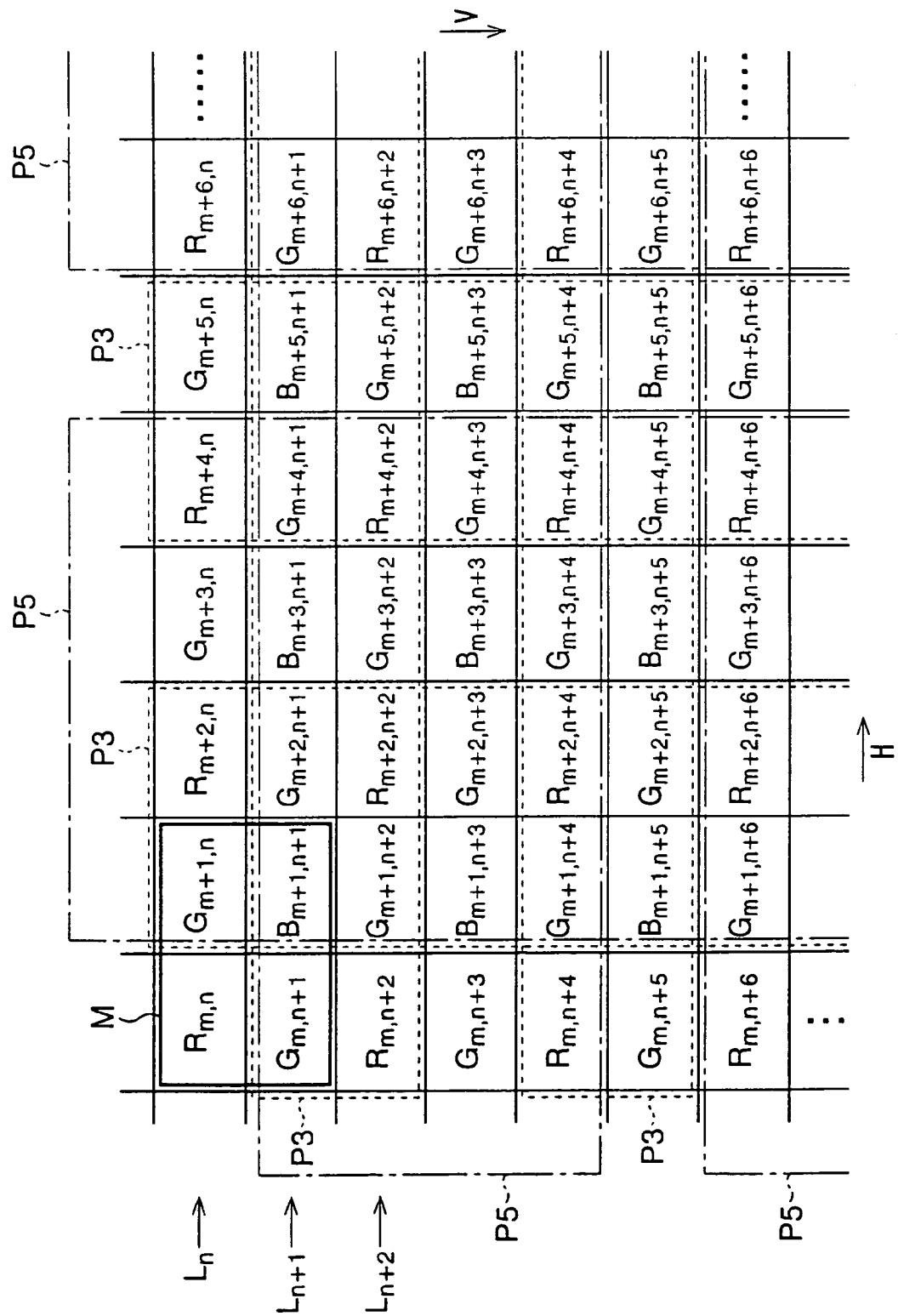
FIG. 3 is a view showing an arrangement of an on-chip color filter provided on an imaging device, or an arrangement of color components of original image data read by the imaging device.

With reference to FIG. 3, an output operation of pixel data from the CCD 30 is described below. On the light receiving surface of the CCD 30, an on-chip color filter of the Bayer arrangement is provided, in which red filter elements, green filter elements and blue filter elements are arranged as shown in FIG. 3. In the drawing, "R", "G" and "B" signify the colors of the filter elements, and the suffixes "m" and "n" signify positions of the color filter elements.

In a row $L_n$, R filter elements and G filter elements are alternately arranged, and in a row $L_{n+1}$, G filter elements and B filter elements are alternately arranged. In rows below the row $L_{n+1}$, the color filter element arrangement of the row $L_n$ and the color filter element arrangement of the row $L_{n+1}$ are alternately repeated. In other words, rectangular R, G and B filter elements are repeatedly arranged in a horizontal direction H and in a vertical direction V, with a minimum unit of a 2×2 matrix M. In the matrix M, two green filter elements are positioned on a diagonal line, and a red filter element and a blue filter element are positioned on another diagonal line.

Each of the color filter elements corresponds to each of the photo-diodes provided on the light receiving surface of the CCD 30. Therefore, by each of the photo-diodes, a pixel data, corresponding to the color of the filter element provided on the photo-diode, is sensed. Pixel data sensed by the photo-diodes are point-sequentially output from the CCD 30. In this output operation, after the pixel data corresponding to the row $L_n$ are output, the pixel data corresponding to the row $L_{n+1}$ are output. Thus, the pixel data are output point by point in each successive row. Therefore, an order, in which each of the pixel data of R, G and B is output, is the same as an order in which each of the color filter elements is arranged as shown in FIG. 3, and in an image formed by pixel data output from the CCD 30, each of the R, G and B components is repeatedly arranged with the unit of 2×2 matrix M. In the following description, since the color arrangement of the image is the same as that of the color filter of the Bayer arrangement, it is supposed that FIG. 3 indicates the image, and the suffixes "m" and "n" indicate the output order of the pixel data, i.e., positions of pixel data in the image.

The original image data output from the CCD 30 are subjected to a predetermined process as described above, and are stored in the image memory 45 as digital pixel data. Addresses of the image memory 45, in which the digital pixel data of R, G and B components are stored, correspond to the positions of the original image data output from the CCD 30. The digital pixel data are read from the image memory 45, and are then subjected to a thinning process so that the image is reduced, as will be described below with reference to FIGS. 3 through 5.

The thinning process is performed in such a manner that an arrangement of R, G and B components of the thinned image data, remains identical with that of the digital pixel data which are not subjected the thinning process, so that, after the thinning process, an interpolation process can be performed in a conventional method. Therefore, when the color components of the original image data, output from the CCD 30, are arranged in such a manner that a (m×m) matrix, formed by said plurality of colors, is repeated, the image can be reduced with a reduction ratio S indicated by a formula (1).

$$S=(1/(m\times(n-1)+1))\times(1/(m\times(n-1)+1)) \quad (1)$$

wherein "n" is an arbitrary positive integer greater than 1. In the thinning process, (m×(n−1)) number of pixel data are thinned out for every (m×(n−1)+1) number of pixel data in a horizontal direction H and a vertical direction V of the image, in accordance with the reduction ratio indicated by the formula (1).

In the embodiment, since "m" is 2, the image can be reduced with the reduction ratio S of (⅓×⅓) time (i.e., n=2) and (⅕×⅕) time (i.e., n=3), for example. Namely, as the reduction ratio, one time (i.e., without reduction), (⅓×⅓) time and (⅕×⅕) time can be selected.

Figure 4:
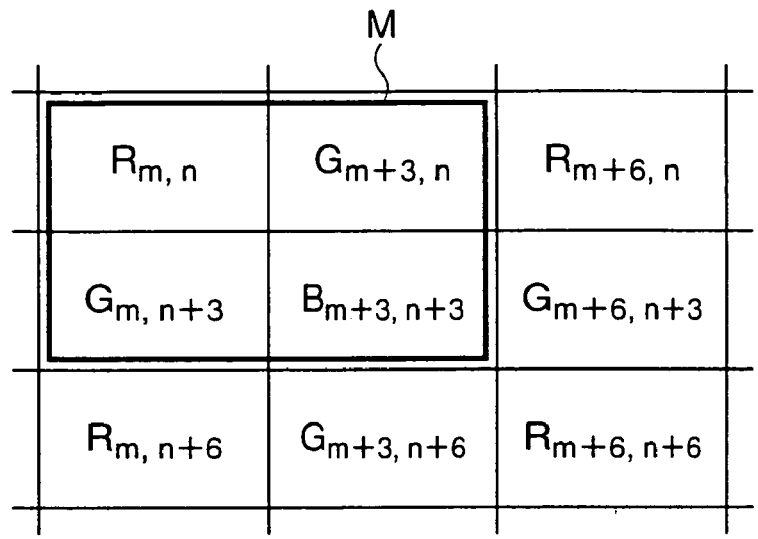
FIG. 4 is a view showing thinned image data, which have been subjected to a thinning process using a reduction ratio of ($\frac{1}{3} \times \frac{1}{3}$) time.

An example, in which the thinning process is performed with the reduction ratio of (⅓×⅓), is described below. In this case, "m" is 2 and "n" is 2 in the formula (1), and thus, 2 pixel data are thinned out for every 3 pixel data in the horizontal direction H and the vertical direction V of the image. Namely, pixel data of R, G and B components positioned in a rectangle shown by broken lines P3 in FIG. 3. In other words, only pixel data ($R_{m,n}$, $G_{m,n+3}$, $G_{m+3,n}$, $G_{m+3,n+3}$ for example) which are not enclosed by the broken lines P3 are read from the image memory 45 so that the thinning process is carried out. If a reduced image is formed by the pixel data, which have been subjected to the thinning process, the arrangement of R, G and B components of the reduced image is, as shown in FIG. 4, the same as that of the image, formed by the digital pixel data without thinning. Namely, in the reduced image, the color components are arranged in such a manner that a (2×2) matrix M is repeated.

Figure 5:
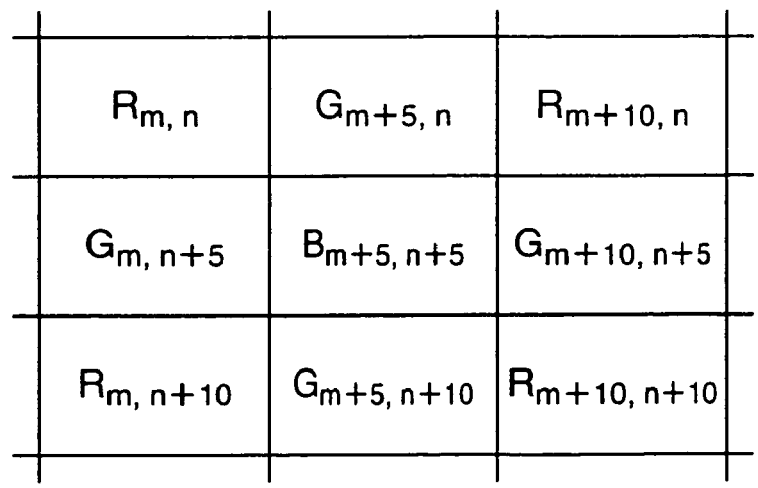
FIG. 5 is a view showing thinned image data, which have been subjected to a thinning process using a reduction ratio of ($\frac{1}{5} \times \frac{1}{5}$) time.

An example, in which the thinning process is performed with the reduction ratio of (⅕×⅕), is described below. In this case, "m" is 2 and "n" is 3 in the formula (1), and thus, 4 pixel data are thinned out for every 5 pixel data in the horizontal direction H and the vertical direction V of the image. Namely, pixel data of R, G and B components positioned in a rectangle shown by chained lines P5 in FIG. 3. In other words, only pixel data ($R_{m,n}$, $G_{m,n+5}$, $G_{m+5,n}$, $B_{m+5,n+5}$, for example) which are not enclosed by the chained lines P5 are read from the image memory 45 so that the thinning process is carried out. If a reduced image is formed by the pixel data, which have been subjected to the thinning process, the arrangement of R, G and B components of the reduced image is, as shown in FIG. 5, the same as that of the image, formed by the pixel data without thinning. Namely, in the reduced image, the color components are arranged in such a manner that a (2×2) matrix M is repeated.

FIG. 6 shows pixel data of the R component, which have been subjected to an interpolation process after the thinning process using the reduction ratio of (⅓×⅓) time, and FIG. 7 shows pixel data of the R component, which have been subjected to an interpolation process after the thinning process using the reduction ratio of (⅕×⅕) time. In FIGS. 6 and 7, the pixel data, to which a mark "•" is attached, is obtained by the interpolation process, in which the marked pixel data is calculated using pixel data positioned around the marked pixel data, and which is the same process as in a conventional device, since the positional relationship of R, G and B components in the reduced image is identical with that of the image, which is formed by pixel data without thinning. Namely, the marked pixel data is obtained by using adjacent pixel data, in such a manner that the adjacent pixel data are each multiplied by a weight coefficient, the resultant values are then totaled together, and then divided by the number of the adjacent pixel data, to obtain the marked pixel data.

The interpolation process is performed for each of the R, G and B components, and thus, the pixel data of the reduced image composed of a single color component are obtained for each of the R, G and B components. The number of pixel data, which have been subjected to the thinning process, is less than that of pixel data, not subjected to the thinning process. Therefore, since the interpolation process is carried out for a reduced number of pixel data, the process time of the interpolation process is reduced in comparison with a conventional device.

Figure 8:
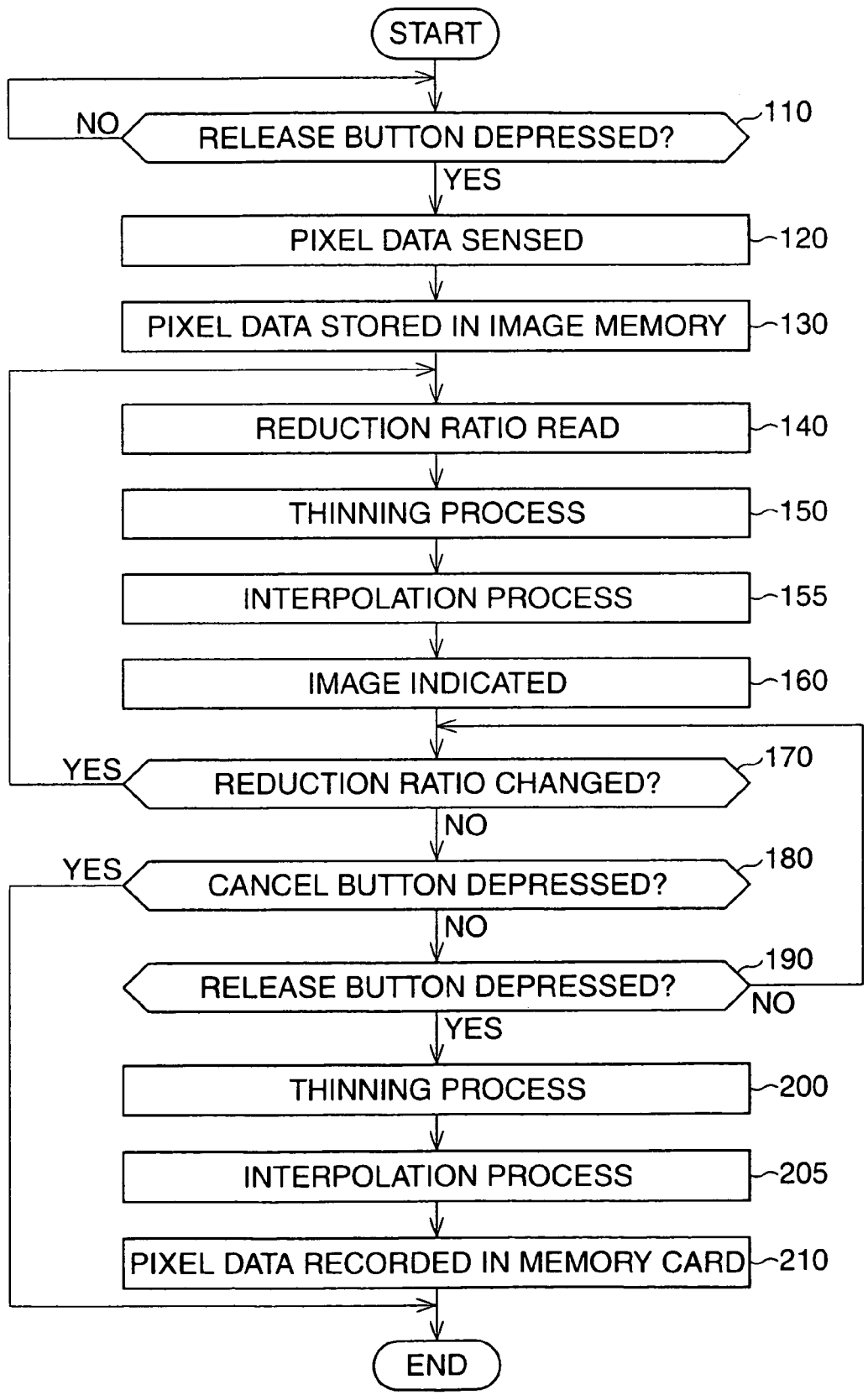
FIG. 8 is a flowchart of a recording routine, by which an image is indicated by a liquid crystal display and image data are recorded in a memory card.

FIG. 8 shows a flowchart of a indication/recording routine, which is executed in the control unit 40 so that an image is indicated by the LCD and image data are recorded in the memory card 60. The image is reduced with a reduction ratio which is set by the reduction ratio setting button provided in the operation panel 15.

In Step 110, it is determined whether the release button 16 is depressed. Step 110 is executed until it is determined the release button 16 has been depressed, and when the release button 16 is depressed, i.e., when a photographing operation is started, the process goes to Step 120.

In Step 120, the CCD 30 is activated, so that pixel data of R, G and B components of an image to be photographed are sensed by the CCD 30. The pixel data are subjected to a predetermined process, and stored in the image memory 45 as digital pixel data, in which addresses, in which the digital pixel data are stored, correspond to the arrangement of colors of the digital pixel data in the image, shown in FIG. 3.

In Step 140, the reduction ratio, (⅕×⅕) time, for example, which has been set by the operation panel 15, is read, and positions of pixel data, which are not to be thinned out, are calculated so that the image is reduced in accordance with the reduction ratio. In Step 150, only the pixel data corresponding to the calculated positions are read from the image memory 45, by which the thinning process is completed. In Step 155, an interpolation process is performed to the thinned image data read in Step 150, so that interpolated image data of R, G and B components are generated for each pixel of the reduced image, respectively, and are stored in a memory provided in the LCD indication circuit 50. Due to Steps 150 and 155, the pixel data for indication of the image by the LCD 11 are generated.

In Step 160, the interpolated image data of R, G and B components are read from the memory of the LCD indication circuit 50, and based on the interpolated image data, the reduced image is indicated by the LCD 11.

A loop formed by Steps 170 through 190 is executed until either one of the reduction ration setting button and the cancel button, which are provided in the operation panel 15, and the release button 16 is depressed, or the process does not proceed.

In Step 170, it is determined whether the reduction ratio has been changed. The user can check the reduced image indicated by the LCD 11, and can depress the reduction ratio setting button of the operation panel 15 to change the reduction ratio. When it is determined in Step 170 that the reduction ratio has been changed, the process goes back to Step 140, so that the image is indicated by the LCD 11 with the changed reduction ratio. Conversely, when it is determined in Step 170 that the reduction ratio has not been changed, the process goes to Step 180.

In Step 180, it is determined whether the cancel button of the operation panel 15 has been depressed. When it is determined that the cancel button has been depressed, i.e. when the pixel data should not be recorded in the memory card 60, the indication/recording routine ends. Conversely, when it is determined that the cancel button has not been depressed, Step 190 is executed.

In Step 190, it is determined whether the release button 16 has again been depressed, i.e., whether the pixel data should be recorded in the memory card 60. When it is determined in Step 190 that the release button 16 has not been depressed, Step 170 is again executed. Conversely, when it is determined that the release button 16 has been depressed, Step 200 is executed, in which only the pixel data, corresponding to the positions calculated in Step 140, are read from the image memory 45, by which the thinning process is completed to obtain thinned image data. The read thinned image data are subjected to an interpolation process in Step 205, so that interpolated image data of R, G and B components are generated, as described above. In Step 210, the interpolated image data of the color components are converted to luminance signals and color differential signals, and are then subjected to a predetermined process such as a data compression. Then, the processed data are stored in the memory card 60 through the memory card controller 62, and thus the indication/recording routine ends. Due to Steps 200 and 205, the pixel data to be recorded in the memory card 60 are generated.

According to the embodiment, when an image is reduced with a predetermined reduction ratio, firstly, a thinning process is performed prior to an interpolation process. Therefore, the number of pixel data, which are subjected to the thinning process, is equal to that of one image. Conventionally, when an image is reduced with a predetermined reduction ratio, the thinning process is performed after the interpolation process. In this case, pixel data read from the CCD are subjected to the interpolation process, so that one image's worth of pixel data are obtained for each of the R, G and B components. Namely, three image's worth of pixel data are generated. Therefore, three image's worth of pixel data are subjected to the thinning process, and the number of pixel data, to be processed, is great. In comparison, in the embodiment, the number of pixel data is not increased being prior to the interpolation process, and only one image's worth of pixel data are subjected to the thinning process. Thus, a time required for the thinning process is reduced.

Further, in the embodiment, since the interpolation process is performed after the number of pixel data is reduced by the thinning process, useless color pixel data, for pixels not included in the thinned image data, are not generated, and thus a calculation time for the interpolation process is shortened. In the interpolation process, one image's worth of pixel data are generated for each of R, G and B components. Namely, three image's worth of color pixel data are generated. However, when the interpolation process is performed, the number of pixel data has already been reduced to that of the reduced image, and therefore, the number of pixel data, which are handled in an image indicating operation and an image recording operation, is decreased, so that a capacity of the memory provided in the LCD indication circuit 50 can be reduced.

Note that, although the on-chip color filter of the Bayer arrangement is provided in the embodiment, an on-chip color filter having the other arrangement, in which an (m×m) matrix of color components is repeatedly arranged, can be utilized. Further, colors of the filter elements are not restricted to R, G and B, and two or more color filters elements can be used.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 10-341680 (filed on Dec. 1, 1998) which is expressly incorporated herein, by reference, in its entirety.

The invention claimed is:

1. An image reading device comprising:
an imaging device that has photo-diodes and a color filter provided on said imaging device, said color filter having color filter elements of a plurality of colors, said photo-diodes generating an original image data containing pixel data, each of the pixel data corresponding to one of said colors, wherein the color filter elements are arranged in a predetermined distribution;
a reading processor that reads said pixel data from said imaging device;
a thinning processor that thins out some of said pixel data to generate a thinned image data, each pixel in the thinned pixel data being separated from each other pixel by at least one pixel data, and colors of the thinned pixel data being arranged in said predetermined distribution; and
an interpolation processor that performs an interpolation process on said thinned image data to generate an interpolated image data for each of said colors, wherein said colors of said original image data are arranged in such a manner that a (m×m) matrix, formed by said plurality of colors, is repeated, and said thinning processor thins out (m×(n−1)) number of pixel data for every (m×(n−1)+1) number of pixel data in a horizontal direction and a vertical direction of an image corresponding to said original image data, wherein each of "m" and "n" is a positive integer greater than 1;
wherein, in the interpolation process, for each pixel a value is calculated based upon adjacent pixel data such that the adjacent pixel data are each multiplied by a weight coefficient, the resulting values are summed, and the sum is divided by a number of the adjacent pixel data.

2. A device according to claim 1, further comprising a reduced image indicating processor that forms a color image based on said interpolated image data and indicates said color image.

3. A device according to claim 1, wherein said colors of said original image data are arranged in such a manner that a (2×2) matrix, formed by said plurality of colors, is repeated, and said thinning processor thins out (2×(n−1)) number of pixel data for every (2×(n−1)+1) number of pixel data in a horizontal direction and a vertical direction of an image corresponding to said original image data.

4. A device according to claim 3, further comprising a reduction ratio setting processor that sets a reduction ratio that determines whereby the number of pixel data thinned out by said thinning processor.

5. A device according to claim 3, wherein said thinning processor thins out 2 pixel data for every 3 pixel data.

6. A device according to claim 5, wherein said colors of said color filter elements are arranged in the Bayer arrangement.

7. A device according to claim 5, wherein said color filter has red filter elements, green filter elements and blue filter elements, and in said (2×2) matrix, said green filter elements are positioned on a diagonal line, and said red filter element and said blue filter element are positioned on another diagonal line.

8. A device according to claim 3, wherein said thinning processor thins out 4 pixel data for every 5 pixel data.

9. A device according to claim 8, wherein said colors of said color filter elements are arranged in the Bayer arrangement.

10. A device according to claim 8, wherein said color filter has red filter elements, green filter elements and blue filter elements, and in said (2×2) matrix, said green filter elements are positioned on a diagonal line, and said red filter element and said blue filter element are positioned on another diagonal line.

11. An image reading device in which pixel data of a first image, formed on an imaging device having an on-chip color filter of a plurality of colors, are point-sequentially read from said imaging device and subjected to an interpolation process to generate components of said plurality of colors for each of said pixel data to obtain a second image, said image reading device comprising:

a thinning processor that thins out some of said pixel data before said pixel data are subjected to said interpolation process, so that said second image is composed of a smaller number of pixels than said first image, wherein each pixel in the thinned pixel data is separated from each pixel by at least one pixel data, and wherein said colors of said original image data are arranged in such a manner that a (m×m) matrix, formed by said plurality of colors, is repeated, and said thinning processor thins out (m×(n−1)) number of pixel data for every (m×(n−1)+1) number of pixel data in a horizontal direction and a vertical direction of an image corresponding to said original image data, wherein each of "m" and "n" is a positive integer greater than 1;

wherein, in the interpolation process, for each pixel a value is calculated based upon adjacent pixel data such that the adjacent pixel data are each multiplied by a weight coefficient, the resulting values are summed, and the sum is divided by a number of the adjacent pixel data.

12. An image reading device comprising:

an imaging device for generating an original image;

a color filter affixed to the imaging device, wherein the color filter comprises color filter elements of a plurality of colors arranged in a predetermined (m×m) matrix pattern, wherein each color filter element comprises at least one pixel;

a thinning processor that thins out (m×(n−1)) number of pixels of the original image for every (m×(n−1)+1) number of pixels along each axis of the original image to generate a thinned image, wherein m and n are positive integers greater than 1, and wherein each pixel in the thinned image is separated from each other pixel by at least one pixel; and an interpolation processor that interpolates the thinned image to generate an interpolated image for each of the plurality of colors, wherein for each pixel, a value is calculated based upon adjacent pixel data such that the adjacent pixel data are each multiplied by a weight coefficient, the resulting values are summed, and the sum is divided by a number of the adjacent pixel data.

13. The image reading device according to claim 12, wherein the matrix pattern comprises a Bayer arrangement.

14. The image reading device according to claim 12, further comprising a reduced image indicating processor that forms a color image based on the interpolated image and indicates the color image.

15. The image reading device according to claim 12, wherein the color filter comprises an on-chip filter.

16. The image reading device according to claim 12, wherein the color filter elements comprise red filter elements, green filter elements and blue filter elements.

17. The image reading device according to claim 16, wherein the green filter elements are positioned on a diagonal line, and the red filter elements and the blue filter elements are positioned on another diagonal.

* * * * *